US011030637B2

(12) United States Patent
Poole et al.

(10) Patent No.: US 11,030,637 B2
(45) Date of Patent: Jun. 8, 2021

(54) SYSTEM AND METHOD PROVIDING FLOW-THROUGH PRIVATE LABEL CARD ACQUISITION

(71) Applicant: Capital One Financial Corporation, McLean, VA (US)

(72) Inventors: Thomas S. Poole, Chantilly, VA (US); David E. Keating, Glen Allen, VA (US); Drew Jacobs, Arlington, VA (US); Janusz M. Niczyporuk, Vienna, VA (US); Luke A. Hammock, Washington, DC (US)

(73) Assignee: Capitol One Services, LLC, McLean, VA (US)

( * ) Notice: Subject to any disclaimer, the term of this patent is extended or adjusted under 35 U.S.C. 154(b) by 293 days.

(21) Appl. No.: 14/288,069

(22) Filed: May 27, 2014

(65) Prior Publication Data

US 2014/0358656 A1 Dec. 4, 2014

Related U.S. Application Data

(60) Provisional application No. 61/828,063, filed on May 28, 2013.

(51) Int. Cl.
*G06Q 30/02* (2012.01)
(52) U.S. Cl.
CPC ................. *G06Q 30/0215* (2013.01)
(58) Field of Classification Search
CPC ...................................................... G06Q 30/00
See application file for complete search history.

(56) References Cited

U.S. PATENT DOCUMENTS

| 6,144,948 | A  | * | 11/2000 | Walker | ................... | G06Q 10/02 |
|           |    |   |         |        |                     | 705/38 |
| 7,831,470 | B1 | * | 11/2010 | Walker | ................. | G06Q 10/101 |
|           |    |   |         |        |                     | 705/14.1 |
| 8,340,719 | B1 | * | 12/2012 | Zands  | ............... | H04M 1/72552 |
|           |    |   |         |        |                     | 455/404.2 |
| 2007/0013767 | A1 | * | 1/2007 | Wang | ............... | G06K 19/06037 |
|           |    |   |         |        |                     | 348/14.01 |

(Continued)

*Primary Examiner* — Eric R Netzloff
(74) *Attorney, Agent, or Firm* — Finnegan, Henderson, Farabow, Garrett & Dunner, L.L.P.

(57) ABSTRACT

The disclosed embodiments include methods, systems, and articles of manufacture for providing offers for merchant accounts. The disclosed embodiments include, for example, a system for providing offers for accounts associated with a merchant. The system may be configured to receive a product identifier from a consumer, the product identifier identifying a product available from a merchant. The system may also determine whether the consumer has a current financial service account associated with the merchant. Further, the system may determine one or more incentives to offer the consumer, the one or more incentives being based at least in part on the product identifier. The system may also generate an invitation to apply for a new financial service account associated with the merchant when the consumer does not have a current financial service account associated with the merchant, communicate the invitation to apply to the consumer, and award the one or more incentives to the consumer based on a response to the invitation to apply.

20 Claims, 5 Drawing Sheets

(56) References Cited

U.S. PATENT DOCUMENTS

| | | | | |
|---|---|---|---|---|
| 2007/0204125 A1* | 8/2007 | Hardy | .................... | G06F 8/62 |
| | | | | 711/170 |
| 2008/0255986 A1* | 10/2008 | Scarborough | ........ | G06Q 40/025 |
| | | | | 705/38 |
| 2009/0099914 A1* | 4/2009 | Lang | .................... | G06Q 30/06 |
| | | | | 705/14.25 |
| 2009/0283601 A1* | 11/2009 | Schultze | ............ | B65H 23/1882 |
| | | | | 235/470 |
| 2012/0042036 A1* | 2/2012 | Lau | .................... | H04W 4/60 |
| | | | | 709/217 |
| 2012/0296725 A1* | 11/2012 | Dessert | ............. | G06Q 30/0208 |
| | | | | 705/14.27 |
| 2013/0268336 A1* | 10/2013 | Prideaux | ............... | G06Q 30/02 |
| | | | | 705/14.23 |
| 2013/0304638 A1* | 11/2013 | Schoenberg | ......... | G06Q 20/327 |
| | | | | 705/39 |
| 2013/0311266 A1* | 11/2013 | Vichich | .................. | G07F 9/001 |
| | | | | 705/14.27 |
| 2013/0325573 A1* | 12/2013 | Park | .................. | G06Q 30/0241 |
| | | | | 705/14.16 |
| 2014/0070001 A1* | 3/2014 | Sanchez | .............. | G06Q 40/025 |
| | | | | 235/380 |

* cited by examiner

SYSTEM AND METHOD PROVIDING FLOW-THROUGH PRIVATE LABEL CARD ACQUISITION

CROSS-REFERENCE TO RELATED APPLICATIONS

This application claims benefit to U.S. Provisional Patent Application No. 61/828,062, filed May 28, 2013, which is incorporated herein by reference in its entirety.

BACKGROUND

Financial service account products have become so universally well-known and ubiquitous that they have fundamentally changed the manner in which financial transactions and dealings are viewed and conducted in society today. For example, credit card products are most commonly represented by plastic card-like members that are offered and provided to customers through credit card issuers (such as banks and other financial institutions). With a credit card or similar financial service account product, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred (also referred to as a revolving charge credit line).

Credit card issuers (such as banks and other financial institutions) usually provide general purpose credit cards that may be used for a plurality of different goods and services and with a wide variety of merchants. For example, a Visa, MasterCard, American Express, Dinner's Club are examples of general purpose credit cards. Since general purpose credit cards are intended for "general use" by a cardholder, they are typically not associated with a single merchant.

Some credit card issuers or merchants issue private label credit cards (e.g., a Sears Charge Card) for use exclusively with a merchant's goods and/or services. Such private label credit cards may be issued to customers of the merchant to provide an incentive to purchase the goods and/or services of the merchant. Private label credit cards may be issued with different types of terms and conditions. For example, a private label credit card may include a private label credit line with a predetermined credit limit and the possibility of deferring payment on an outstanding balance with a finance or interest charge (e.g., a revolving credit line). A private label credit card may also include a charge account that requires the cardholder to pay the balance in full at the end of each month or the card may include an installment line of credit where the cardholder is required to make a fixed, periodic payment to the merchant (or the merchant's representative) until the installment debt is paid.

Merchants offering private label cards, in some cases, provide incentives to consumers to apply for the private label card. For example, a merchant may offer a one-time discount on a purchase made by the merchant if the consumer applies, and is approved, for the private label card. Private label cards offer advantages to merchants as they can be an additional source of revenue through interest collected on the account and/or provide opportunities to direct market to consumers by using data associated with the private label accounts, such as the consumers' mailing addresses, email addresses, and spending habits.

SUMMARY

Disclosed embodiments include methods, systems, and articles of manufacture configured to, for example, provide flow-through financial service account acquisition, such as for example, private label financial service accounts.

The disclosed embodiments include, for example, a system for providing offers for accounts associated with a merchant. The system may be configured to receive a product identifier from a consumer, the product identifier identifying a product available from a merchant. The system may also determine whether the consumer has a current financial service account associated with the merchant. Further, the system may determine one or more incentives to offer the consumer, the one or more incentives being based at least in part on the product identifier. The system may also generate an invitation to apply for a new financial service account associated with the merchant when the consumer does not have a current financial service account associated with the merchant, communicate the invitation to apply to the consumer, and award the one or more incentives to the consumer based on a response to the invitation to apply.

The disclosed embodiments may also include a computer-implemented method for providing offers for accounts associated with a merchant. In one aspect, the method may include receiving, by one or more processors, a product identifier from a consumer. The product identifier may identify a product available from a merchant. The method may also include determining, by the one or more processors, whether the consumer has a current financial service account associated with the merchant. Further, the method may include determining, by one or more processors, one or more incentives to offer the consumer. The one or more incentives may be based, at least in part, on the product identifier. The method may also include generating, by one or more processors, an invitation to apply for a new financial service account associated with the merchant when the consumer does not have a current financial service account associated with the merchant. The method may also include communicating, by one or more processors, the invitation to apply to the consumer, and awarding, by one or more processors, the one or more incentives to the consumer based on a response to the invitation to apply.

In one embodiment, the disclosed embodiments may be configured to allow a consumer to send, via a client device, a product identifier that identifies a product available from a merchant to an incentive provider system. The incentive provider system may determine one or more incentives based on the product identifier. When the consumer does not have a financial service account with the merchant, the incentive provider system may generate an invitation to apply for a account associated with the merchant. Upon approval of the consumer's application, the incentives may be awarded to the consumer's newly formed financial service account.

In certain aspects, the disclosed embodiments may be configured to allow a consumer, via a client device, to electronically collect product identifier information for a product while at the merchant's location, and send, via the client device, the product identifier information to the incentive provider system while at the merchant location. In further embodiments, a financial service provider system may receive the application request for the new financial service account, process the request, and provide an approval response to the consumer in near-real time, such as, for example, in a time frame such that the consumer may use the new financial service account to use the incentives while at the merchant location.

In some embodiments, the incentives may include discounts for the product available from the merchant or for discounts on a related second product also available from the merchant. More than one incentive may apply to a product. In certain aspects, the disclosed embodiments may use incentive criteria to determine which incentives to offer to the consumer. For example, the disclosed embodiments may analyze the identity of the consumer and the consumer's credit worthiness to determine which incentive to offer to the consumer.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

DETAILED DESCRIPTION

Figure 1:
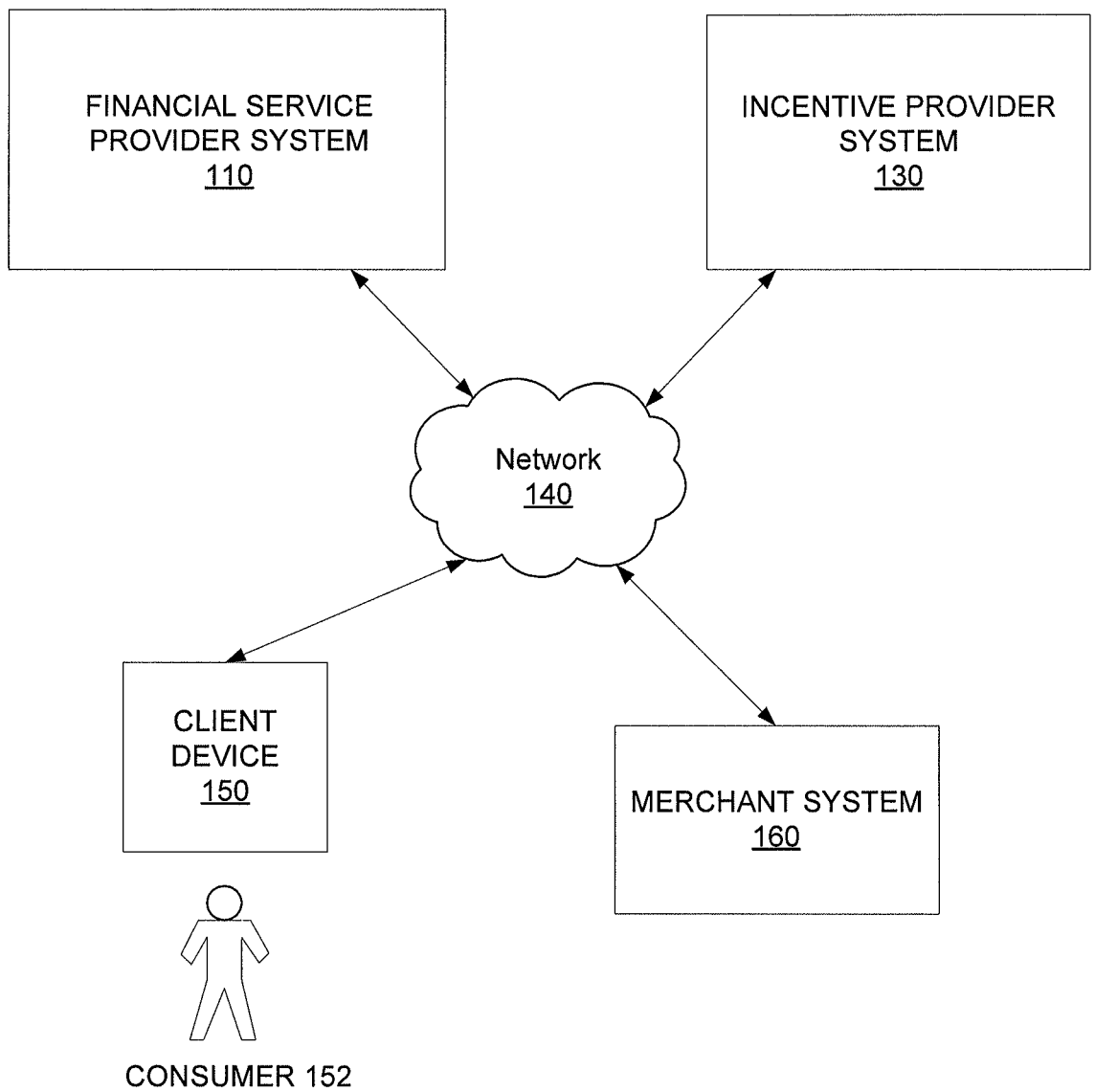
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

Currently, when merchants offer an incentive to apply for a credit card, the incentive is typically the same across all purchases. For example, a typical incentive might be for a merchant to offer a 10% discount on the consumer's total purchase when the consumer applies for the merchant's private label card. One disadvantage with this incentive system is that when consumers make a small purchase, the incentive does not entice the consumer to apply for the private label card. For example, if a consumer makes a $50 purchase, a 10% discount would only result in $5 of savings for the consumer, and the consumer may not consider the $5 of savings worth the effort required to apply for private label card. The consumer may delay applying for the private label card until she makes a larger purchase, but in some cases, the consumer delays applying for the card indefinitely, thereby resulting in a wasted opportunity for the merchant to get another private label card member.

Additionally, consumers may not be enticed by the incentive to open a private label credit account with the merchant because the incentive is only a one-time incentive. As a result, consumers may not feel the one-time incentive is attractive enough to open a new credit line with an interest rate that may be higher than their other credit lines and can only be used with the merchant. In addition, while one-time incentives may encourage consumers to apply for the private label card, they do not encourage frequent use. As a result, merchants and the financial service providers that manage private label credit card accounts may miss opportunities to earn interest revenue or collect spending data that can be leveraged for marketing efforts.

In addition, when consumers do take advantage of the incentive offered by the merchant and apply for the private label card, sales personnel must take the time to submit the consumer's application to the financial service provider servicing the private label card. Typically the incentive is offered to the consumer during a purchase transaction. As a result, the processing of other consumers' transactions may be delayed while the sales personnel is helping the first consumer apply for the private label card, which may cause irritation and possible loss sales. Merchants may divert (or during busy seasons even hire additional) sales personnel to handle the private label card application or other consumer purchase transactions, but such a tactic introduces inefficiencies as diverted sales personnel must change tasks on-demand.

The disclosed embodiments include, for example, a system and method providing flow-through financial service account acquisition, such as a private label account acquisition. While examples of the disclosed embodiments are described in the context of a private label card (e.g., credit card, rewards card, etc.), the disclosed embodiments are not limited to such types of financial service account. The disclosed embodiments may provide methods and systems for providing flow-through account acquisition that involve other types of financial service accounts, such as general purpose credit card accounts, debit accounts, checking or savings accounts, or any other type of financial service account that may be provided and used in the manner consistent with the disclosed embodiments.

In one aspect, incentives for a private label card (or any other types of financial service account) may be determined based on a product that is of interest to a consumer. A consumer may provide a product code to a financial service provider offering a private label account for a merchant. In some embodiments, the consumer may scan a product code, such as a UPC bar code or QR code, corresponding to a particular product using a client device, such as a mobile device (e.g., tablet, smart phone, PDA, etc.). In other aspects, the client device may be configured to use other types of technologies and processes to electronically collect product identification information, such as near field communications, radio frequency communications, blue tooth technologies, etc. The product code may include product identification information, such as the product's stock keeping unit (SKU) number. The disclosed embodiments may use the product identification information to determine what incentive to provide to the consumer. If the consumer already holds a private label card (or other type of financial service account) for the merchant, the incentive may be designed to entice the consumer to purchase the product for which information was collected, or a second product that is related to the product for which information was collected. If the consumer does not hold a private label card, the incentive may be designed to entice the consumer to apply for the private label card. The incentive may be a discount for the product, a free product, a discount on a total purchase, or a discount on a related product.

In some embodiments, when the consumer does not have a private label card and scans a product code with her mobile device, the disclosed embodiments may be configured to automatically determine, generate and provide to the consumer, via a client device, an invitation to apply for the private label credit card account via an electronic message. For example, the product code may contain information to redirect processing to a website or mobile application to being the application process. Once redirected, the consumer may apply for the private label card using her client device (e.g., mobile device), and need not involve sales personnel.

According to some embodiments, when the consumer is presented with an incentive, either to apply for the private label card, or to use the private label card, she has an opportunity to accept the incentive and apply it to a purchase. In some embodiments, scanning the product code may redirect the consumer, via a client device, to a website hosted by the merchant or a mobile application offered by the merchant, and product details and the incentive are displayed. The consumer can then accept the incentive using her client device. In some embodiments, the purchase is completed using the consumer's private label credit card account (in some cases, newly acquired) and the order may be processed by shipping the product to the shipping address associated with the consumer's private label credit card account, or some other shipping address provided by the consumer. In certain embodiments, the purchase transaction for the new product may be initiated, performed, and/or processed using one or more processes and components/systems disclosed in provisional patent application No. 61/828,015, entitled SYSTEMS AND METHODS FOR OFFERING PRODUCTS USING LINKED TRANSACTIONS, filed on May 28, 2013, the disclosure of which is herein incorporated by reference in its entirety, including the drawings. In some embodiments, when the purchase is completed, the consumer may be provided with an electronic receipt, and the consumer can take delivery of the purchased item at the merchant's location (e.g., the merchant's brick and mortar store front).

FIG. 1 is a block diagram of an exemplary system 100 for performing one or more operations consistent with the disclosed embodiments. In one embodiment, system 100 may include one or more financial service provider system 110, one or more incentive provider system 130, one or more client devices 150, one or more merchant systems 160, and a network 140. The components and arrangement of the components included in system 100 may vary. Thus, system 100 may include fewer or additional components that perform or assist in the performance of one or more processes consistent with the disclosed embodiments.

One or more components of system 100 may be computing systems configured to provide flow-through private label card acquisition using incentives. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices are configured to execute software instructions stored on one or more memory devices to perform one or more operations consistent with the disclosed embodiments. Components of system 100 may be configured to communicate with one or more other components of system 100, including financial service provider system 110, incentive provider system 130, client devices 150, and/or merchant system 160. In certain aspects, users may operate one or more components of system 100 to initiate one or more operations consistent with the disclosed embodiments. In some aspects, the one or more users may be employees of, or associated with, the entity corresponding to the respective component(s) (e.g., someone authorized to use the underlying computing systems or otherwise act on behalf of the entity). In other aspects, the consumer may not be an employee or otherwise associated with underlying entity. In still other aspects, the user may itself be the entity associated with the respective component (e.g., consumer 152 operating client device 150).

Financial service provider system 110 may be a system associated with a financial service provider, such as a bank, credit card issuer, credit bureau, credit agency, or other entity that generates, provides, manages, and/or maintains financial service accounts for one or more users. Financial service provider system 110 may generate, maintain, store, provide, and/or process financial data associated with one or more financial service accounts. Financial data may include, for example, financial service account data (e.g., financial service account identification data, financial service account attribute data (e.g., account balance, available credit, existing fees, reward points, and user profile information), financial service account transaction data (e.g., transaction dates, transaction amounts, transaction types, location of transaction, etc.). Financial service provider system 110 may include infrastructure and components that are configured to generate and/or provide financial service accounts such as credit card accounts (including private label credit card accounts), checking accounts, savings account, debit card accounts, loyalty or reward programs, lines of credit, and the like.

Incentive provider system 130 may be a computing system configured to provide incentives for apply for private label cards and using private label cards consistent with disclosed embodiments. For example, incentive provider system 130 may be a computer system configured to execute software instructions that automatically determine, generate, and provide incentives. In certain non-limiting aspects, the incentives may include discounts on products (e.g., goods or services), free products, or discounts on total purchase made with a merchant. In some aspects, the incentives are associated with a particular product. For example, an incentive to apply for a private label card may be 25% discount when applied to a $50 shirt, but it may be a 15% discount when applied to a suit. In certain embodiments, incentive provider system 130 may be configured to receive product identification information (e.g., SKU data) and associated incentives from merchant system 160. Incentive provider system 130 may also be configured to receive product identification information from client device 150 and to determine an associated incentive (e.g., but using the data received from merchant system 160 associating product identification information with incentives). Incentive provider system 130 may also provide offers or invitations to apply for financial service accounts. In some aspects, incentive provider system 130 may also provide an mobile application or host a website allowing consumers to apply for private label cards.

According to some embodiments, incentive provider system 130 may include a computing system that is affiliated with, or is part of, financial service provider system 110. Incentive provider system 130 may include one or more computing devices (e.g., server(s)), memory storing data and/or software instructions (e.g., database(s), memory devices, etc.) and other known computing components. Incentive provider system 130 may be configured to communicate with one or more components of system 100, such as financial service provider system 110, merchant systems 160, and/or client devices 150. Incentive provider system 130 may be configured to provide incentives for applying for private label cards or using private label cards via an interface(s) accessible by consumers over a network (e.g., the Internet).

Client device(s) 150 may be one or more computing devices configured to perform one or more operations consistent with disclosed embodiments. Client device 150 may be a mobile device (e.g., tablet, smart phone, etc.), a desktop computer, a laptop, a server or any other type of computing device. Client device 150 may also include a television, e-reader, or any other type of device capable of communicating with other components of system 100 and presenting business ratings content. According to some embodiments, client device 150 may comprise a network-enabled computing device operably connected to one or more other presentation devices, which may themselves constitute client devices 150.

Client device(s) 150 may include one or more processors configured to execute software instructions stored in memory, such as memory included in client device 150. Client device 150 may include software that when executed by a processor performs known Internet-related communication and content presentation processes. For instance, client device 150 may execute software that generates and displays interfaces and/or content on a presentation device included in, or connected to, client device 150. Client device 150 may be a mobile device that executes mobile device applications and/or mobile device communication software that allows client device 150 to communicate with components of system 100 over network 140. The disclosed embodiments are not limited to any particular configuration of client device 150.

Merchant system 160 may be one or more computing systems associated with a merchant that provides products (e.g., goods and/or services), such as a restaurant (e.g., Outback Steakhouse®, Burger King®, etc.), retailer (e.g., Amazon.com®, Target®, etc.), grocery store, service provider (e.g., utility company, insurance company, financial service provider, automobile repair services, etc.), non-profit organization (ACLU™, AARP®, etc.) or any other type of entity that provides goods, services, and/or information that consumers (i.e., end-users or other business entities) may purchase, consume, use, etc. For ease of discussion, the present disclosure may describe exemplary embodiments in the context of purchase transactions involving goods from retail merchant systems. However, merchant system 160 is not limited to systems associated with retail merchants that conduct business in any particular industry or field.

Merchant system 160 may be associated with a merchant brick and mortar location(s) that a consumer (e.g., consumer 152) may physically visit and purchase goods and services. Such physical locations may include merchant system 160, which may include computing devices that perform financial service transactions with consumers (e.g., Point of Sale (POS) terminal(s), kiosks, etc.). Merchant system 160 may also include back- and/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or service via known online or e-commerce type of solutions. For example, such a merchant may sell products via a website using known online or e-commerce systems and solutions to market, sell, and process online transactions. Merchant system 160 may include server(s) that are configured to execute stored software instructions to perform operations associated with a merchant, including one or more processes associated with processing purchase transactions, generating transaction data, generating product data (e.g., SKU data) relating to purchase transactions, etc.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as links between financial service provider system 110, incentive provider system 130, client device 150, and merchant system 160.

Figure 2:
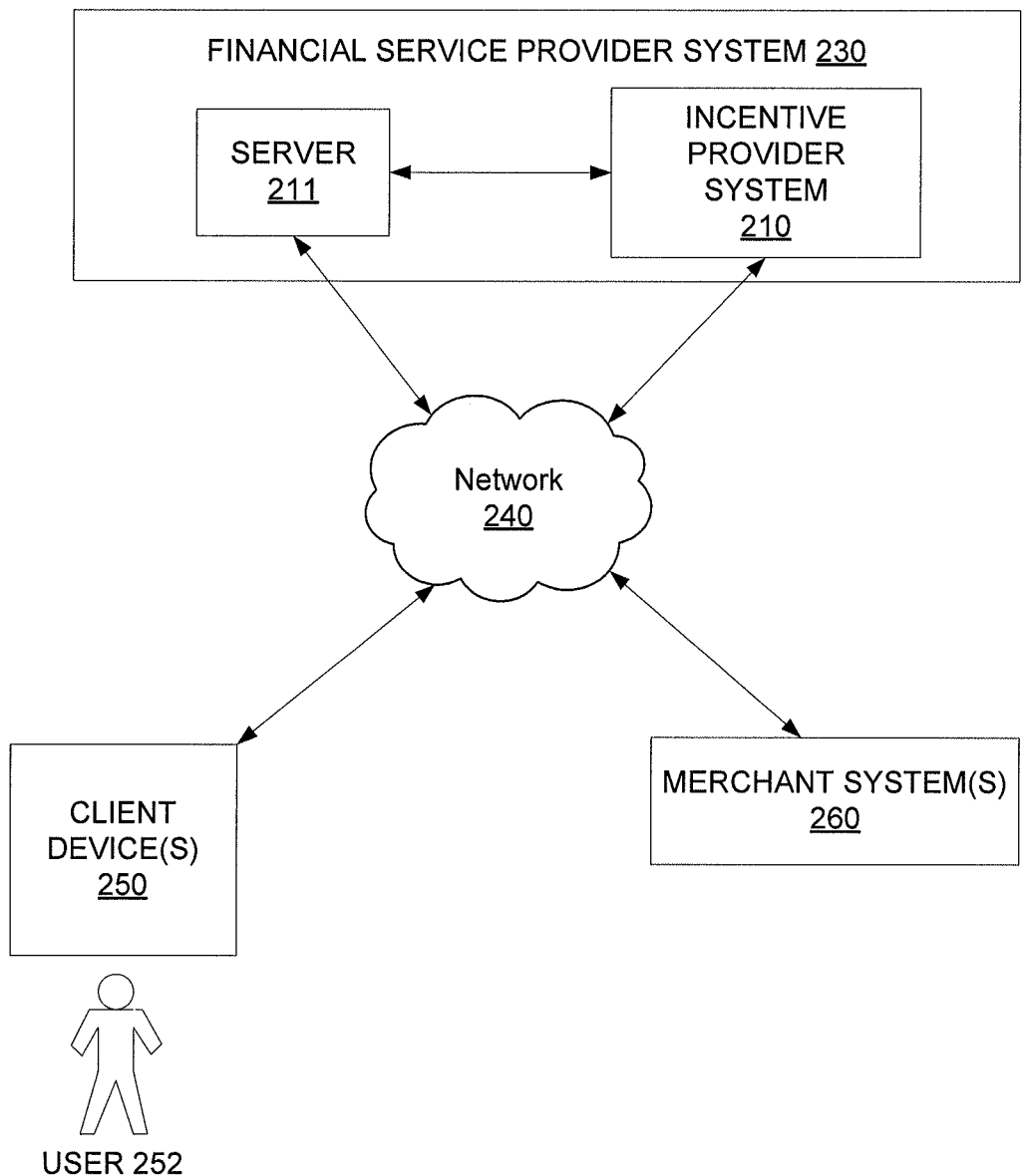
FIG. 2 is a block diagram of another exemplary system, consistent with disclosed embodiments.

FIG. 2 is a block diagram of an exemplary system 200 that may perform one or more operations consistent with the disclosed embodiments. In certain embodiments, financial service provider system 210 may be configured to include incentive provider system 230 consistent with disclosed embodiments, or the incentive provider system may be configured to include the incentive provider system (not shown). For example, financial service provider system 210 may include incentive provider system 230 that is configured to provide incentives in a manner consistent with that disclosed above in connection with incentive provider system 230 as shown in FIG. 1. Consistent with disclosed embodiments, incentive provider system 230 may use or otherwise directly communicate with computing devices of financial service provider system 210 (e.g., server 211). Furthermore, incentive provider system 230 may directly access memory devices of financial service provider system 210 (not shown) to retrieve, for example, financial transaction data associated with consumers or merchants to determine appropriate incentives. Incentive provider system 230 may otherwise be configured and operate similar to incentive provider system 130 disclosed above in connection with FIG. 1. Similarly, financial service provider system 210, client devices 250, and merchant systems 260 may be configured and operate similar to similarly labeled components disclosed above in connection with FIG. 1.

Alternatively, the disclosed embodiments may include a financial service provider system 110 that includes an incentive provider system 130. As another example, financial service provider 110 may be configured to execute software instructions that performs the same operations and functions as those disclosed herein in connection with incentive provider system 130 or 230.

It is to be understood that the configuration and boundaries of the functional building blocks of systems 100 and 200 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, incentive provider systems 130, 230 may constitute a part of components of systems 100, 200 other than those specifically described (e.g., merchant system 160, 260 and/or client devices 150, 250) or may constitute a part of multiple components of system 100 (i.e., a distributed system). Such alternatives fall within the scope and spirit of the disclosed embodiments.

Figure 3:
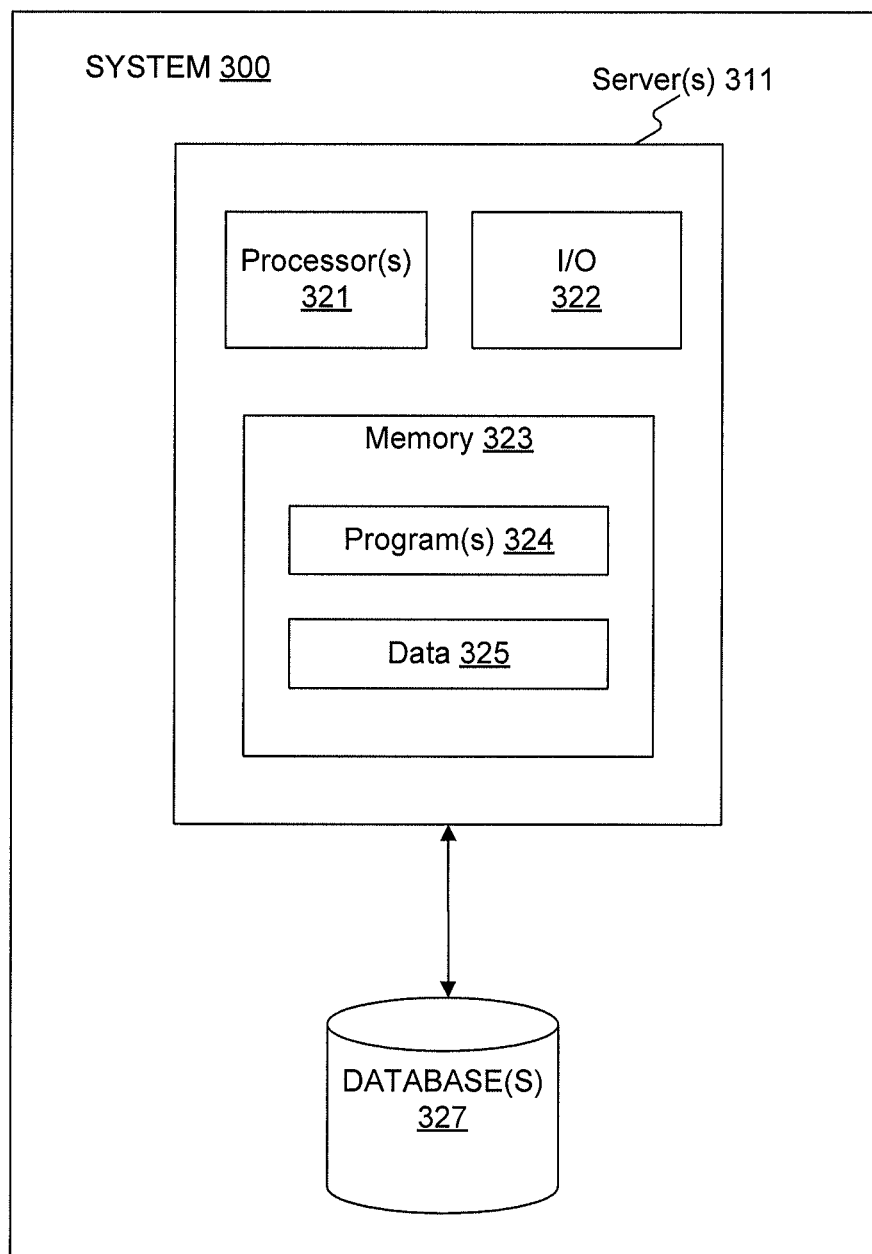
FIG. 3 is a block diagram of another exemplary system, consistent with disclosed embodiments.

FIG. 3 shows an exemplary system 300 for implementing certain embodiments consistent with the present disclosure.

For example, system 300 may represent components included with financial service provider system 110, incentive provider system 130, client devices 150, and/or merchant systems 160. For instance, financial service provider system 110 may be configured with a computer system similar to system 300. Also, for example, merchant system 160 may be configured with a computer system similar to system 300.

In one embodiment, system 300 may include a computing device (shown as an example server 311) having one or more processors 321, one or more memories 323, and one or more input/output (I/O) devices 322. In some embodiments, server 311 may take the form of a mobile computing device, general purpose computer, a mainframe computer, or any combination of these components. Alternatively, server 311 (or a system including server 311) may be configured as a particular apparatus, embedded system, dedicated circuit, and the like based on the storage, execution, and/or implementation of the software instructions that perform one or more operations consistent with the disclosed embodiments. According to some embodiments, server 311 may comprise web server(s) or similar computing devices that generate, maintain, and provide web site(s) consistent with disclosed embodiments. Server 311 may be standalone, or it may be part of a subsystem, which may be part of a larger system. For example, server 311 may represent distributed servers that are remotely located and communicate over a network (e.g., network 140) or a dedicated network, such as a LAN. Server 311 may correspond to server 211, or separately to any server or computing device included in financial service provider system 110, incentive provider system 130, client devices 150, and/or merchant systems 160.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 311.

Memory 323 may include one or more storage devices configured to store instructions used by processor 321 to perform one or more operations consistent with the disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example, financial service provider system 110, incentive provider system 130, client devices 150, and/or merchant systems 160, may, via server 311, access one or more remote programs that, when executed, perform functions related to certain disclosed embodiments. Memory 323 may also store data 325 that may reflect any type of information in any format that the system may use to perform operations consistent with the disclosed embodiments.

I/O devices 322 may be one or more devices configured to allow data to be received and/or transmitted by server 311. I/O devices 322 may include one or more digital and/or analog communication devices that allow server 311 to communicate with other machines and devices, such as other components of systems 100 and 200.

Server 311 may also be communicatively connected to one or more database(s) 327. Server 311 may be communicatively connected to database(s) 327 through network 140. Database 327 may include one or more memory devices that store information and are accessed and/or managed through server 311. By way of example, database(s) 327 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

Figure 4:
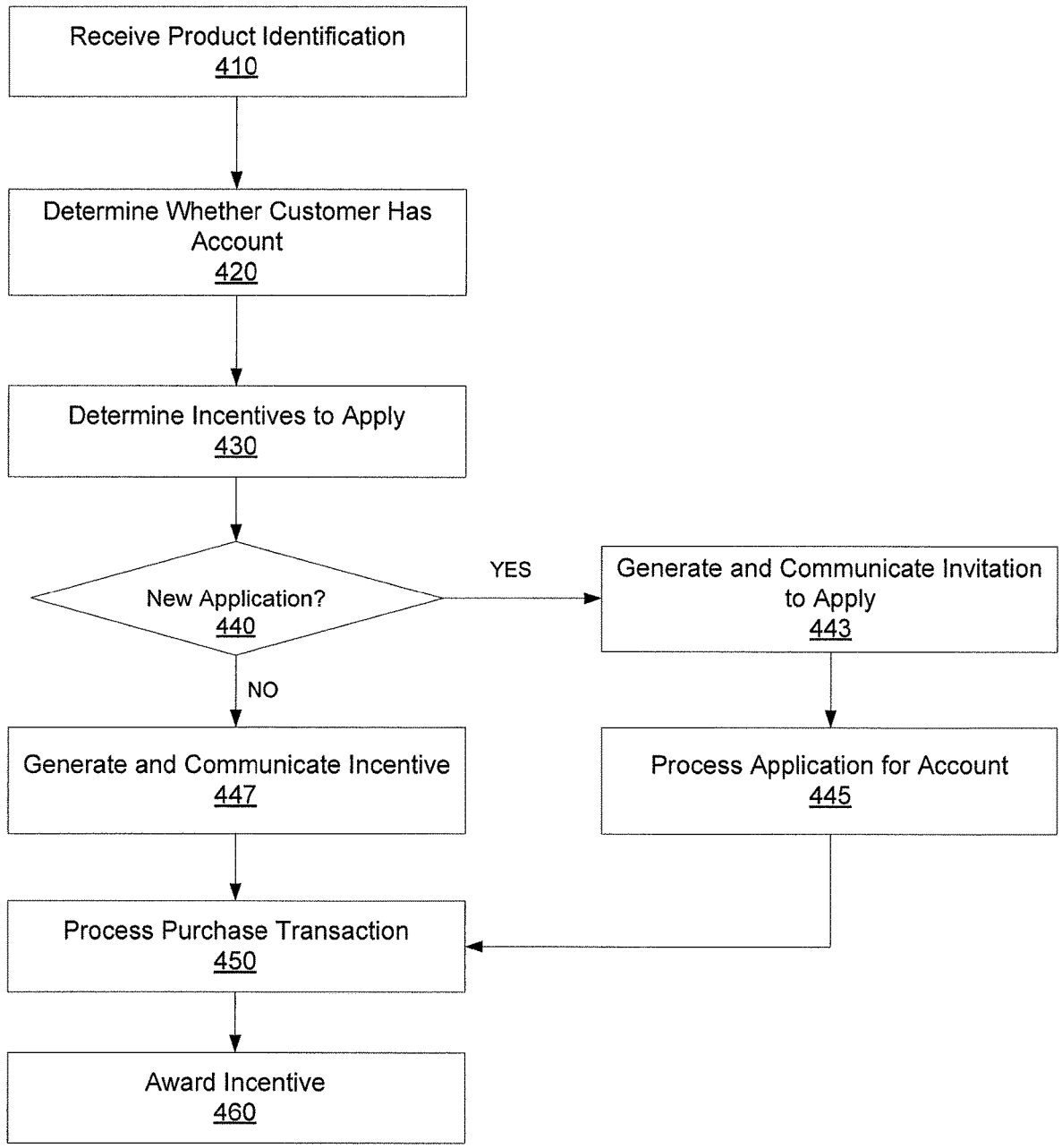
FIG. 4 is a flowchart of an incentive providing process, consistent with disclosed embodiments.

FIG. 4 shows a flowchart of an exemplary incentive providing process 400 consistent with disclosed embodiments. According to some embodiments, one or more processes of process 400 may be performed by incentive provider system 130 by executing software instructions stored in one or more memory devices. Incentive providing process 400 may be executed by incentive provider system 130 to provide flow-through private label card acquisition by providing incentives to apply for or use private label cards (or other types of financial service accounts) to purchase products in which consumers have expressed interest, for example, by scanning a product code associated with the product.

In some embodiments, incentive provider system 130 may receive a product identification (step 410). In one aspect, the product identification may be sent by client device 150 after consumer 152 scans or enters a product code at a merchant location. The product code may be a universal product code (UPC) barcode or Quick Response Code (QR Code) two dimensional bar code. In some embodiments, client device 150 may execute a client side, mobile application that is configured to use an image scanning device (e.g., a camera) that is part of client device 150 to capture the product code. In some embodiments, client device 150 may capture an image of the product code using commercial off the shelf (COTS) software configured to capture product code images, such as Google Googles®, QR Reader, Quick Scan, QR Droid™, or any other COTS software configured to scan and interpret UPC bar codes or QR codes. Client device 150 may be configured to perform other types of electronic data collection processes, such as near field communications, Bluetooth communications, RF communications, and the like. In such embodiments, a merchant may provide products with corresponding tags or similar components that interface with such electronic data collection processes implemented with client device 150.

In some embodiments, the product code has embedded within it metadata that directs an application executing on client device 150 to redirect processing to website or other URL location. The client device 152 may be redirected to a website where a mobile application for the merchant can be downloaded and installed on the mobile device for applying for and using the merchant's private label card. The product code may also, in certain embodiments, include a URL location that redirects a web browser executing on the client device to a website served by incentive provider system 130. The website may provide one or more user interface elements for the consumer to view incentives, accept incentives, or apply for and use the private label card consistent with disclosed embodiments.

According to some embodiments, merchants may offer a product code that is not associated with a specific product, but rather, may be used by consumers for the sole purpose of applying for the merchant's private label card (or other type of financial service account). For example, at the merchant's brick-and-mortar retail location, the merchant may display an advertisement for the merchant's private label card. The advertisement may include a product code (e.g., a QR code), and offer one or more incentives for applying for the merchant's private label card. The advertisement may describe an incentive that is a total discount for all purchases made within a particular time frame (e.g., that day, week, or month), or it may describe an incentive that is tied to particular products and can be awarded when consumers scan product codes and purchase the products at the merchant's store. Accordingly, flow-through for private label card acquisition may occur through the consumer's scan of a product code related to applying for the private label card, or through the consumer's scan of a product code related to a particular product. In either case, the product code is used by the disclosed embodiments, in part, to determine the incentive to offer the consumer for applying for and using the merchant's private label card.

According to some embodiments, the incentive provider system 130 may receive product identification from the client device via a custom mobile application. The merchant may offer a mobile application that is specifically designed to scan the merchant's product codes and provide incentives to its private label credit card account holders or those applying for private label credit card accounts. For example, Store A may offer a mobile application that can be downloaded through a mobile application marketplace (e.g., Apple's App Store®, Google Play®, Amazon Appstore for Andorid) or by scanning a product code available in Store A's brick-and-mortar store or mail-order catalog. The mobile application, when executed by client device 150, may generate a request that provides an interface displayed on a display device for identification information, such as name, address, and phone number. Once downloaded and installed, the consumer may, via client device executing the mobile application, visit Store A (or view Store A's mail-order catalog) and use the mobile application to scan one or more product codes, and the incentive provider system 130 may receive the product information via Store A's mobile application.

According to one embodiment, the incentive provider system 130 may determine if the consumer providing the product identification (e.g., step 410) has a private label credit card account (or other type of financial service account) with the merchant (step 420). In one embodiment, where the merchant provides (e.g., via merchant system 160 or another system), a mobile application for scanning product codes, consumer identification information obtained when the consumer downloaded and installed the mobile application can be used by the incentive provider system 130 (performed by incentive provider computer 130, for example) to identify the consumer. The incentive provider system 130 may then use the consumer's identification information to determine if the consumer has a private label credit card account with the merchant. In some embodiments, the merchant's mobile application installed on client device 150 may be linked to the consumer's private label credit card account. For example, the consumer may provide her private label credit card account number through the merchant's mobile application executing on client device 150. The presence of a private label credit card account number associated with the consumer may be used by incentive provider system 130 to determine if the consumer has a private label credit card account with the merchant. In some embodiments, other identification of the consumer may be used. For example, the consumer's name, address, phone number, or email address may be used to determine whether the consumer has a private label credit card account for the merchant.

In some embodiments, incentive determination process 400 determines the consumer has a private label credit card account through a query to the consumer. For example, after scanning a product code, the client device 150 may be redirected to a website hosted by incentive provider system 130. The website may display a page that asks the consumer of they have a private label credit card account with the merchant. If so, the website may request additional account information such as the private label credit card account number or login credentials associated with a merchant hosted website or a website hosted by financial service provider for the purpose of managing the consumer's private label credit card account online. If the consumer responds (via client device 150) that she does not have a private label credit card account with the merchant, then the incentive determination process may determine incentives to offer the consumer and send the consumer an invitation to apply consistent with embodiments disclosed above and below.

According to some embodiments, the incentive provider system 130 may determine if the consumer has a private label merchant account (step 420). In one example, process 400 may include extracting contact information (e.g., a mobile telephone number or email address) from client device 150. The disclosed embodiments may use the contact information to query a database of financial service provider 110 to determine if there is a private label credit card account holder with a telephone number or email address matching the extracted information. If so, the incentive provider system 130 may direct a query, as described above, to the consumer to confirm the account.

When the consumer has a private label account with the merchant the incentive determination process 400 may determine one or more incentives to provide to the consumer to encourage the consumer to purchase one or more products from the merchant using the consumer's private label credit card (step 430). When the consumer does not have a private label account with the merchant, the incentive determination process 400 may determine one or more incentives to provide to the consumer to encourage the consumer to apply for a private label card and to purchase one or more products from the merchant using the private label credit card once approved (step 430). The incentive determination process will be further described with respect to FIG. 5.

Figure 5:
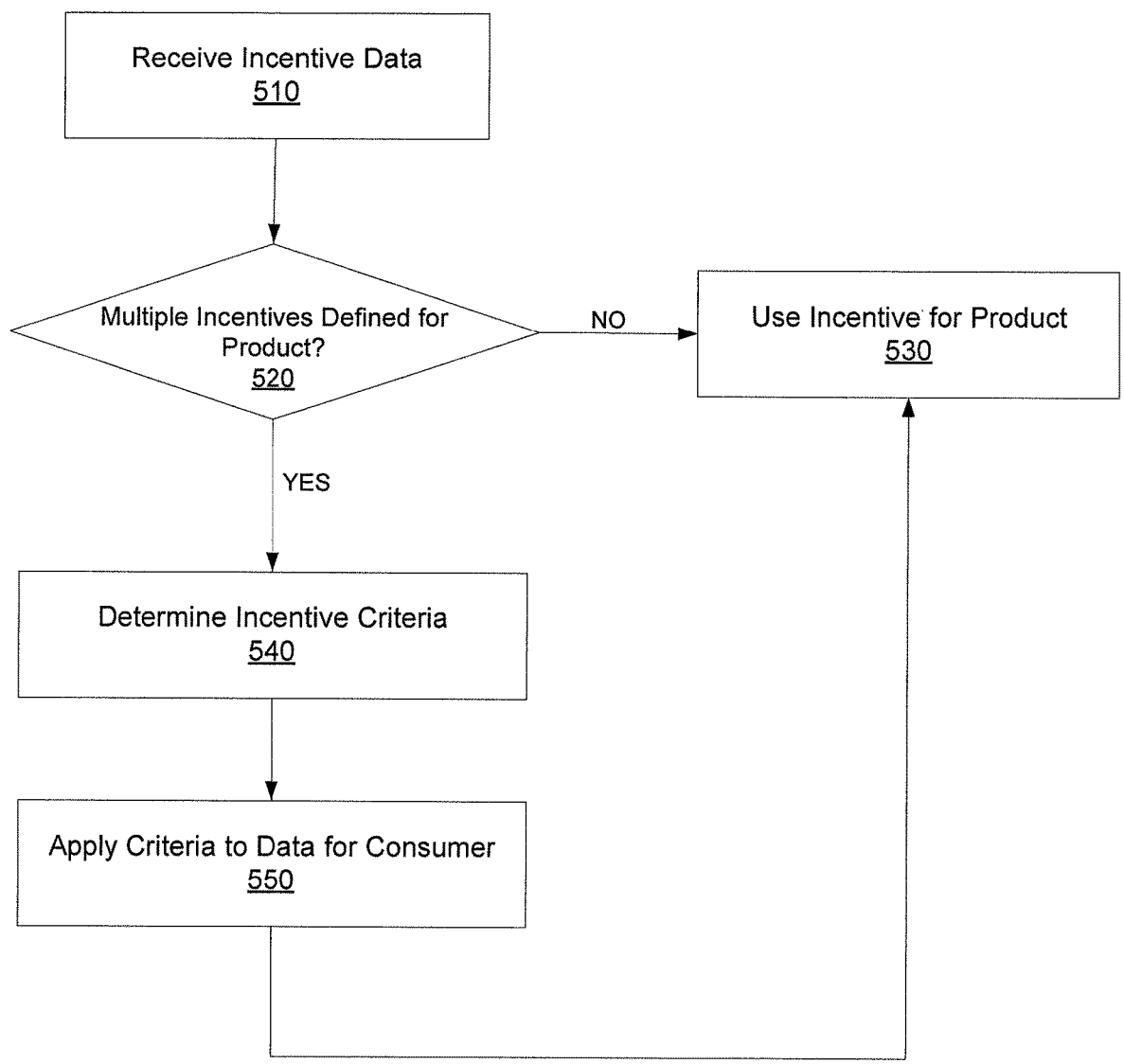
FIG. 5 is a flowchart of an incentive determination process, consistent with disclosed embodiments.

FIG. 5 illustrates a flowchart of an exemplary incentive determination process 500 consistent with disclosed embodiments. According to some embodiments, one or more processes of process 500 may be performed by incentive provider system 130 by executing software instructions stored in one or more memory devices. In one aspect, the incentive provider system 130 receives incentive data (step 510). The incentive data may be received from merchant system 150 or, in some embodiments, from financial services provider system 110. The incentive data may include a mapping of product identification information to incentives, and may be the complete data set for all incentives the merchant is offering to encourage the use of the merchant's private label card, or to encourage a consumer to apply for and use the merchant's private label card.

In some embodiments, the product identification information may be defined as the product's SKU number or some other number capable of uniquely identifying a product. The incentive may be defined as a discount for the product identified with the product identification information. For example, if the product identification number corresponds to a blue shirt, the incentive may be a discount for purchasing the blue shirt. In some embodiments, the incentive may be defined as a discount on a product related to the product identified with the product identification number. For example, if the product identification number corresponds to a blue shirt, the incentive may be a discount for purchasing a matching pair of pants. Other incentives may be included in the incentive data, such as, free associated products, buy one, get one free products, total discounts, or loyalty reward points.

Incentive provider system 130 may receive incentive data on a periodic basis, for example, daily, weekly, or monthly. The incentive data may be provided on an as-needed basis. For example, the incentive data may be received each time a consumer scans a product code. The incentive data may be provided through an API that the incentive provider system 130 exposes to other computer systems, such as financial service provider system 110 and merchant system 160. The incentive data may be provided as binary data stream, serialized data object, XML object, or in some other form known to those with skill in the art.

In some embodiments, more than one incentive may be defined for certain product identification numbers and the incentive data may also include incentive criteria. The incentive criteria may define when one of a plurality of incentives applies to a particular consumer for a particular product. In some embodiments, the incentive criteria may indicate that a first incentive applies for current private label account holders purchasing a particular product, and a second incentive applies for non-private label account holders applying for, and using, a new private label credit card account for purchasing the product. For example, the incentive criteria may indicate that a 10% discount should be applied to the purchase of an appliance for current private label account holders and a 25% discount should be applied to the purchase of the appliance for consumers applying for new a new private label credit card account.

Incentive criteria may be more granular allowing for a greater variety of incentives associated with a single product to offer to consumers that are loyal customers of the merchant or have a strong credit history. For example, a merchant selling electronics may offer multiple incentives for purchasing a television, such as: (1) a 10% discount for current private label credit account holders that have spent less than $2000 in the last year with the merchant and have also paid their accounts on time within the last year; (2) a 20% discount for current private label credit account holders that have spent over $2000 in the last year with the merchant and have also paid their accounts on time within the last year; (3) a 5% discount for all other private label credit account holders; (4) a 20% discount for new private label credit card account holders (e.g., those applying as a result of the incentive) having a credit score above 700 and (5) a 10% discount for all other new private label credit account holders.

In some embodiments, the incentive criteria may also include incentives defined relative to a competitor. The incentive may be triggered when a competitor offers the same product at a lower price, and/or the incentive might include beating the competitor's price. For example, a consumer that is a holder of a merchant's private label credit card account is interested in purchasing a vacuum. The consumer may visit the merchant's brick-and-mortar location and scan a product code associated with the vacuum. The merchant may have defined incentive criteria for the vacuums such a 5% discount is offered to a consumer for purchasing the vacuum using her private label merchant credit card account, if the vacuum is offered at VacuumsOnline.com at a lower price.

In some embodiments, the incentive provider system 130 determines if multiple incentives have been defined for a received product code identification (step 520). If not, and only one incentive has been defined (step 520: YES), the one incentive will be used to encourage the consumer to purchase the product associated with the sent product identification information (at step 410). On the other hand, if more than one incentive is defined (step 520: yes), the incentive criteria is determined using the incentive data sent by merchant system 150 or the financial services provider system 110 (step 540).

The incentive provider system 130 then applies the incentive criteria to data for the consumer. Based on the incentive criteria, the incentive provider system 130 may collect additional information concerning the consumer that sent the product identification information (e.g., step 410). For example, if the incentive criteria is based on past customer purchases, the merchant system 150 may be queried to determine past purchases.

In one aspect, when the incentive criteria is based on prices for the product offered by the competition (such as the vacuum example above), the incentive provider system 130 may use the product identification information to search the website of the competitor for the price of the product to determine if the incentive should be offered. For example, the product identification information may be a SKU number that is used by all merchants selling the product. The incentive provider system 130 may use the SKU number to search for the product and obtain the price of the product available from the competitor.

In some embodiments, the incentive criteria is based on the credit worthiness of the consumer. For example, in the case of a consumer applying for a new private label credit card account with the merchant, the credit score or other credit worthiness indicator associated with the consumer may be used to determine the incentive. Accordingly, the incentive provider system 130 may make an inquiry into the customer's credit. For example, the incentive provider system 130 may query financial services provider system 110 with a soft credit inquiry (i.e. an inquiry not requiring a full credit check), or a hard credit inquiry (i.e., one requiring a credit check) regarding the consumer. In some embodiments, the incentive provider system 130 may make an inquiry into the customer's credit using a credit bureau computer system (not shown), such as a computer system of Experian, TransUnion, or Equifax, for example.

Once incentive provider system 130 collects the data necessary to apply the incentive criteria, it compares the data to the incentive criteria to determine which incentive to offer to the consumer (step 550). Once determined, the incentive may be used in a communication to the consumer to encourage the consumer to purchase the product using the private label merchant card as defined below.

Returning to FIG. 4, if the incentive determined at step 430 (e.g., using the process described with respect to FIG. 5), is for a consumer that does not have a private label merchant card (step 440: YES), an invitation to apply for the private label credit card is generated and communicated to the consumer (step 443). The invitation to apply may include details concerning the incentive. For example, the invitation to apply may indicate that if the consumer applies for the private label card and purchases the scanned product using the newly opened private label card account, they are entitled to a 15% discount on the product associated with the product identification code scanned by the consumer. The invitation to apply may also indicate that the consumer is entitled to additional discounts for using the private label card on other products for which the consumer scans product codes and purchases using the merchant's private label credit card account. In some embodiments, the invitation to apply may indicate that the consumer is entitled to an increased discount if the consumer has an excellent credit history. The invitation to apply may also include any terms and conditions for the private label credit card account, or any other information that must accompany invitations to apply as required by law.

In some embodiments, the invitation to apply may be communicated to the consumer through the merchant's mobile application (as described above). For example, client device 150 may display one or more user interfaces with the details of the invitation to apply and one or more user interface elements (e.g., text fields, drop down lists, etc.) that may be used by the consumer to apply for the private label card. In some embodiments, some of the user interface elements may be pre-populated with data collected by incentive provider system 130 when the consumer downloaded and installed the merchant's mobile application on client device 150. In some embodiments, the invitation to apply may be displayed in a webpage hosted by incentive provider system 130, or the invitation to apply may be sent in an email to the customer with one or more hyperlinks redirecting the consumer to a webpage to apply for the merchant's private label credit card.

When the consumer chooses to accept the invitation to apply, the incentive provider system 130 processes the application for the private label credit card account (step 445). According to some embodiments, incentive provider system 130 may communicate data received from the consumer's acceptance of the invitation to apply to financial services provider system 110 to process the application. Once financial services provider system 110 processes the application, it may communicate the results back to the system executing incentive provider system 130 (e.g., incentive provider system 130), and if the consumer is approved, also communicate the newly opened private label credit card account number. Once received, incentive provider system 130 may communicate the results (e.g., approved or denied), including the new private label credit card account number to client device 150. In some embodiments, the new private label credit card account number is associated with the merchant's mobile application installed on the client device 150 so that when the consumer uses the client device 150 to purchase products (e.g., by scanning product codes), the consumer need not enter the new private label credit card account number.

In some embodiments, incentive provider system 130 processes the application by using the information provided by the consumer (e.g., name, address, social security number), to obtain the consumer's credit history. The consumer's credit history may be obtained through financial services provider system 110 or a credit bureau computer system (not shown). Once the consumer's credit history is obtained, it may be compared to criteria established by the merchant to determine if the consumer has an acceptable credit history to be approved for a private label card. If so, a request is sent to financial services provider 110 to open a new account and obtain a private label credit card account number. In some embodiments, the new private label credit card account number is associated with the merchant's mobile application installed on the client device 150 so that when the consumer uses the client device 150 to purchase products (e.g., by scanning product codes), the consumer need not enter the new private label credit card account number.

When the consumer is an existing private label credit card account holder (step 440: NO), the incentive determined at step 430 (e.g., using the process described with respect to FIG. 5) is generated and communicated to the consumer (step 447). The incentive may be communicated through a user interface that is displayed on client device 150 executing the merchant's mobile application. In some embodiments, the incentive may be communicated to the consumer using an email address associated with the consumer's private label credit card account, or the incentive may be communicated to the consumer using a text message sent to a mobile phone number or short message service address associated with the consumer's private label credit card account.

Once the consumer either receives the incentive to purchase the product (at step 447) or the application process for a new private label credit card account is completed (at step 445), the consumer may purchase the product for which she scanned the product code (step 450). In some embodiments, to receive the incentive, the consumer purchases the product using her private label credit card account for the merchant. The consumer may use the merchant's mobile application to purchase the product regardless of whether the consumer scanned the product code at the merchant's brick-and-mortar store or the consumer scanned the product code from one of the merchant's advertisements or catalogs. For example, a consumer may have scanned a product code, received an invitation to apply, and accepted the invitation to apply using the merchant's mobile application. The application process of the consumer may then flow through to the purchase of the scanned item by using the mobile application and the newly acquired private label credit card account number (which has been associated with the mobile application executing on the consumer's client device). After applying for the private label credit card account, the consumer need not enter the newly acquired account number to complete the purchase, as it has been associated with the mobile application.

In some embodiments, when the consumer agrees to purchase the product, incentive provider system 130 receives a message that the consumer wishes to purchase the product, and it may transmit a message containing a purchase order to the merchant system 160 and may also transmit a purchase transaction to financial serviced provider system 110 to credit the merchant and debit the consumer's private label credit card account. Further, incentive provider system 130 may award the incentive to the consumer (step 460). For example, when the incentive is a discount on the purchase of the product associated with the scanned product code, the discount may be applied to the purchase price before the purchase transaction is transmitted to financial services provider 110. In some embodiments where the incentive is a free product, incentive provider system 130 may submit a purchase order for the product, or otherwise communicate, to merchant system 160 that the free product should be delivered to the consumer.

The described embodiments provide a system and method for providing flow-through private label card acquisition, i.e., interest in products flows through to acquiring a private label credit card account, which flows through to purchases. In operation, the system and method provides incentives to consumers to apply for private label credit cards and use private label credit cards to make purchases with merchants. Flow-through using described embodiments can be illustrated in a non-limiting example for explanatory purposes only.

A first consumer enters a merchant's brick and mortar store. The first consumer does not have the merchant's mobile application installed on her mobile device and the first consumer does not hold a private label credit card account for the merchant. The first consumer sees a pair of shoes that interest her. The merchant may display in close proximity to the shoes a QR code and a sign that indicates that incentives may be available for the shoes when the shoes are purchased using the merchant's private label credit card account. The first consumer may scan the QR code using her mobile device. The metadata of the QR code may direct the first consumer to download the merchant's mobile application. Once the first consumer downloads the mobile application and registers with the merchant, her mobile device may display an invitation to apply for the merchant's private label credit card. The invitation to apply indicates that if she applies for the merchant's private label credit card she can receive a discount of 15% on the shoes and that the resulting price is lower than that offered on DiscountShoes.com. The first consumer accepts the invitation to apply and applies for the private label credit card. The first consumer is approved and her private label credit card account information is associated with the mobile application executing on her mobile device. The mobile application provides the first consumer with the option to purchase the shoes at the discounted price (the incentive price). The first consumer purchases the shoes using the mobile application and elects to receive an electronic receipt so that she can pick up the shoes immediately. The first consumer presents the electronic receipt to sales personnel and receives the shoes.

A second consumer enters the merchant's brick and mortar store. The second consumer does not have the merchant's mobile application installed on his mobile device and the second consumer does not hold a private label credit card account for the merchant. The second consumer sees a pair of pants that interest him. The merchant may display in close proximity to the pants a QR code and a sign that indicates that incentives may be available for the pants when the pants are purchased using the merchant's private label credit card account. The second consumer may scan the QR code using his mobile device. The metadata of the QR code may direct the second consumer to download the merchant's mobile application. Once the second consumer downloads the mobile application and registers with the merchant, his mobile device may display an invitation to apply for the merchant's private label credit card. The invitation to apply indicates that if he applies for the merchant's private label credit card he can receive a discount of 20% on the pants and a free blue shirt. The second consumer accepts the invitation to apply and applies for the private label credit card. The second consumer is approved and his private label credit card account information is associated with the mobile application executing on his mobile device. The mobile application provides the second consumer with the option to purchase the pants at the discounted price and receive the free shirt (the incentive price). The second consumer purchases the pants using the mobile application. The second consumer elects to have the pants and shirt shipped to his home address as he is currently on vacation.

A third consumer enters the merchant's brick and mortar store. The third consumer already has the merchant's mobile application installed on his mobile device and the third consumer has a private label credit card account for the merchant. The third consumer sees a suit that interests him. The merchant may display in close proximity to the suit a QR code and a sign that indicates that incentives may be available for the suit when the suit is purchased using the merchant's private label credit card account. The third consumer may scan the QR code using his mobile device and the merchant's mobile application. A sale price exclusive to private label card members of $400 for the suit, when the suit is purchased using the private label card, is displayed on a user interface of the mobile application. The user interface also lists two other competitors' prices for the suit that are higher than $400. The third consumer elects to purchase the suit for $400 using the mobile application executing on his mobile device. The $400 is charged to his private label credit card account. The third consumer elects to have the suit delivered to a shipping address that is associated with his private label credit card account.

The above examples are non-limiting and are provided for explanatory purposes only. Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system comprising:
   one or more memory devices storing software instructions; and
   one or more processors configured to execute the software instructions to:
     receive, at an incentive provider system, over a communications network, a product identifier from a mobile application running on a mobile computing device, the mobile application being previously downloaded and installed on the mobile computing device and being associated with a merchant system of a merchant, the merchant system being distinct from the incentive provider system, the product identifier identifying a product available from the merchant and acquired by the mobile application from the merchant system based on a scan of a product code using an image scanning device on the mobile computing device;
     transmit, by the incentive provider system, a query to a financial service provider system of a financial service provider, the financial service provider system being distinct from the incentive provider system, the query comprising information related to the product identifier and a consumer's identity information associated with the mobile application;
     receive, by the incentive provider system, from the financial service provider in response to the query, an indication that the consumer does not have a current financial service account associated with the merchant, the financial service account being provided by the financial service provider distinct from the merchant;

determine, based on the indication, by the incentive provider system, one or more incentives to offer the consumer to apply for a new financial service account at the financial service provider system, the new financial service account being associated with the merchant, the one or more incentives being targeted at the consumer based at least in part on a purchase at the merchant of the product associated with the product identifier using the mobile application and the new financial service account;

generate, by the incentive provider system, instructions for automatically displaying, in an interface of the mobile application, a user interface element and an invitation to apply for the new financial service account at the financial service provider system, the invitation identifying the one or more incentives;

transmit, by the incentive provider system, over the communications network, the instructions to automatically display the user interface element and the invitation in an interface of the mobile application, the user interface element being pre-populated with data collected by the incentive provider system when the mobile application was downloaded and installed on the mobile device, the invitation enabling the consumer to apply, using the mobile application associated with the merchant system and without leaving the mobile application, for the new financial service account provided by the financial service provider;

automatically link, by the incentive provider system, the new financial service account with the mobile application, the linking enabling the consumer to purchase the product using the mobile application and the new financial service account; and transmit, by the incentive provider system, to the financial service provider system, commands to apply the one or more incentives to a transaction using the new financial service account, responsive to receiving a request initiated from the mobile application to purchase the product using the new financial service account.

2. The system of claim 1, wherein the one or more processors are configured to apply the one or more incentives based on a determination that the consumer does not have a current credit account associated with the merchant.

3. The system of claim 1, wherein the one or more incentives are discounts for purchasing the product available from the merchant.

4. The system of claim 1, wherein the one or more incentives are discounts for purchasing a second product related to the product available from the merchant.

5. The system of claim 1, wherein determining one or more incentives includes selecting at least one incentive based on incentive criteria.

6. The system of claim 1, wherein determining one or more incentives includes determining the identity of the consumer and the consumer's past purchases.

7. The system of claim 5, wherein the incentive criteria includes determining credit worthiness of the consumer.

8. A computer-implemented method comprising:

receiving, over a communications network by one or more processors of an incentive provider system, a product identifier from a mobile application running on a mobile computing device, the mobile application being previously downloaded and installed on the mobile computing device and being associated with a merchant system of a merchant, the merchant system being distinct from the incentive provider system, the product identifier identifying a product available from the merchant and acquired by the mobile application from the merchant system based on a scan of a product code using an image scanning device on the mobile computing device;

transmitting, over the communications network by one or more processors of the incentive provider system, a query to a financial service provider system of a financial service provider, the financial service provider system being distinct from the incentive provider system, the query comprising-information related to the product identifier and a consumer's identity information associated with the mobile application;

receiving, over the communications network by the one or more processors of the incentive provider system, from the financial service provider in response to the query, an indication that the consumer does not have a current financial service account associated with the merchant, the financial service account being provided by the financial service provider distinct from the merchant;

determining, based on the indication, by the one or more processors of the incentive provider system, one or more incentives to offer the consumer to apply for a new financial service account at a financial service provider system, the new financial service account being associated with the merchant, the one or more incentives being targeted at the consumer based at least in part on a purchase at the merchant of the product associated with the product identifier using the mobile application and the new financial service account;

generating, by the one or more processors of the incentive provider system, instructions for automatically displaying, in an interface of the mobile application, a user interface element and an invitation to apply for the new financial service account at the financial service provider system, the invitation identifying the one or more incentives;

transmitting, over the communications network, by the one or more processors of the incentive provider system, the instructions to automatically display the user interface element and the invitation in an interface of the mobile application, the user interface element being pre-populated with data collected by the incentive provider system when the mobile application was downloaded and installed on the mobile device, the invitation enabling the consumer to apply, using the mobile application associated with the merchant system and without leaving the mobile application, for the new financial service account provided by the financial service provider;

automatically linking, by the one or more processors of the incentive provider system, the new financial service account with the mobile application, the linking enabling the consumer to purchase the product using the mobile application and the new financial service account; and transmitting, by the one or more processors of the incentive provider system, to the financial service provider system, commands to apply the one or more incentives to a transaction using the new financial service account, responsive to receiving a request initiated from the mobile application to purchase the product using the new financial service account.

9. The method of claim 8, wherein applying the one or more incentives includes:
accepting, from the consumer, an application for the new financial service account; and
determining that the consumer does not have a current financial service account associated with the merchant.

10. The method of claim 8, wherein the one or more incentives are discounts for purchasing the product available from the merchant.

11. The method of claim 8, wherein the one or more incentives are discounts for purchasing a related second product, the related second product being related to the product available from the merchant.

12. The method of claim 8, wherein determining one or more incentives includes selecting at least one incentive based on incentive criteria.

13. The method of claim 8, wherein determining one or more incentives includes determining the identity of the consumer and the consumer's past purchases.

14. The method of claim 12, wherein the incentive criteria includes determining credit worthiness of the consumer.

15. A non-transitory computer readable medium storing instructions that, when executed by one or more processors of an incentive provider system, causes the one or more processors to perform operations comprising:
receiving, at an incentive provider system, over a communications network, a product identifier from a mobile application running on a mobile computing device, the mobile application being previously downloaded and installed on the mobile computing device and being associated with a merchant system of a merchant, the merchant system being distinct from the incentive provider system, the product identifier identifying a product available from the merchant and acquired by the mobile application from the merchant system based on a scan of a product code using an image scanning device on the mobile computing device;
transmitting, by the incentive provider system, a query to a financial service provider system of a financial service provider, the financial service provider system being distinct from the incentive provider system, the query comprising information related to the product identifier and a consumer's identity information associated with the mobile application;
receiving, by the incentive provider system, from the financial service provider in response to the query, an indication that the consumer does not have a current financial service account associated with the merchant, the financial service account being provided by the financial service provider distinct from the merchant;
determining, based on the indication, by the incentive provider system, one or more incentives to offer the consumer to apply for a new financial service account at a financial service provider system, the new financial service account being associated with the merchant, the one or more incentives being targeted at the consumer based at least in part on a purchase at the merchant of the product associated with the product identifier using the mobile application and the new financial service account;
generating, by the incentive provider system, instructions for automatically displaying, in an interface of the mobile application, a user interface element and an invitation to apply for the new financial service account at the financial service provider system, the invitation identifying the one or more incentives;
transmitting, by the incentive provider system, over the communications network, the instructions to automatically display the user interface element and the invitation in an interface of the mobile application, the user interface element being pre-populated with data collected by the incentive provider system when the mobile application was downloaded and installed on the mobile device, the invitation enabling the consumer to apply, using the mobile application associated with the merchant system and without leaving the mobile application, for the new financial service account provided by the financial service provider;
automatically linking, by the incentive provider system, the new financial service account with the mobile application, the linking enabling the consumer to purchase the product using the mobile application and the new financial service account; and
transmitting, by the incentive provider system, to the financial service provider system, commands to apply the one or more incentives to a transaction using the new financial service account, responsive to receiving a request initiated from the mobile application to purchase the product using the new financial service account.

16. The non-transitory computer readable medium of claim 15, wherein applying the one or more incentives includes:
accepting, from the consumer, an application for the new financial service account; and
determining that the consumer does not have a current financial service account associated with the merchant.

17. The non-transitory computer readable medium of claim 15, wherein the one or more incentives are discounts for purchasing the product available from the merchant.

18. The non-transitory computer readable medium of claim 15, wherein the one or more incentives are discounts for purchasing a related second product, the related second product being related to the product available from the merchant.

19. The non-transitory computer readable medium of claim 15, wherein determining one or more incentives includes selecting at least one incentive based on incentive criteria.

20. The non-transitory computer readable medium of claim 15, wherein determining one or more incentives includes determining the identity of the consumer and the consumer's past purchases.

* * * * *